(12) United States Patent
Han (10) Patent No.: US 12,117,837 B2
(45) Date of Patent: Oct. 15, 2024

(54) UNMANNED VEHICLE PATH CONTROL METHOD, APPARATUS, AND SYSTEM

(71) Applicant: BEIJING JINGDONG ZHENSHI INFORMATION TECHNOLOGY CO., LTD., Beijing (CN)

(72) Inventor: Song Han, Beijing (CN)

(73) Assignee: BEIJING JINGDONG ZHENSHI INFORMATION TECHNOLOGY CO., LTD., Beijing (CN)

(*) Notice: Subject to any disclaimer, the term of this patent is extended or adjusted under 35 U.S.C. 154(b) by 525 days.

(21) Appl. No.: 17/604,095

(22) PCT Filed: Mar. 24, 2020

(86) PCT No.: PCT/CN2020/080866
§ 371 (c)(1),
(2) Date: Oct. 15, 2021

(87) PCT Pub. No.: WO2020/233222
PCT Pub. Date: Nov. 26, 2020

(65) Prior Publication Data
US 2022/0221871 A1    Jul. 14, 2022

(30) Foreign Application Priority Data
May 17, 2019   (CN) .......................... 201910411149.1

(51) Int. Cl.
*G05D 1/00* (2024.01)
(52) U.S. Cl.
CPC ......... *G05D 1/0217* (2013.01); *G05D 1/0234* (2013.01); *G05D 1/0287* (2013.01)

(58) Field of Classification Search
CPC ................. B60W 30/10; B60W 40/10; B60W 2050/0005; B60W 2520/06;
(Continued)

(56) References Cited

U.S. PATENT DOCUMENTS 9,665,095 B1 * 5/2017 Romano ................ B25J 9/0096
9,702,707 B2 * 7/2017 Goldman ........... G01C 21/1656
(Continued)

FOREIGN PATENT DOCUMENTS

CN   102955476 A   3/2013
CN   103777637 A   5/2014
(Continued)

OTHER PUBLICATIONS

"First Office Action and English language translation", CN Application No. 20191041149.1, Apr. 6, 2022, 15 pp.
(Continued)

*Primary Examiner* — Mohamed Abdo Algehaim
(74) *Attorney, Agent, or Firm* — Myers Bigel, P.A.

(57) ABSTRACT

An unmanned vehicle path control method, apparatus, and system queries the current position and a target position of an unmanned vehicle. Path planning according to the current position, the target position, and a heading direction indicated by landmarks arranged on two sides of a road is performed, so as to obtain a planned path having the minimum path cost. The unmanned vehicle travels forward on a predetermined side of the road and sends the planned path to the unmanned vehicle, so that the unmanned vehicle reaches the target position according to the planned path.

15 Claims, 8 Drawing Sheets

(58) Field of Classification Search
CPC ........... B60W 2552/53; G01C 21/3658; G01C 21/3476; G01C 21/3446; G01C 21/00–21/3896; G05D 1/0217; G05D 1/0234; G05D 1/0287; G05D 1/00–1/87; G05D 1/244; G05D 2107/70; G06V 20/588
USPC .......................................................... 701/23
See application file for complete search history.

(56) References Cited

U.S. PATENT DOCUMENTS

| | | | | |
|---|---|---|---|---|
| 10,689,200 | B1* | 6/2020 | Lwali | B07C 5/36 |
| 10,859,382 | B1* | 12/2020 | Swidersky | G01C 21/206 |
| 11,188,097 | B1* | 11/2021 | Zou | G05D 1/0291 |
| 2013/0190963 | A1* | 7/2013 | Kuss | G07C 5/008 701/23 |
| 2014/0207325 | A1* | 7/2014 | Mudalige | B62D 15/0255 701/25 |
| 2016/0349757 | A1* | 12/2016 | Si | G01S 17/931 |
| 2017/0225891 | A1* | 8/2017 | Elazary | G05D 1/0234 |
| 2017/0308070 | A1* | 10/2017 | Elazary | G05B 19/41895 |
| 2018/0039282 | A1* | 2/2018 | Gupta | G05D 1/0274 |
| 2018/0239343 | A1* | 8/2018 | Voorhies | G05D 1/0234 |
| 2019/0187699 | A1* | 6/2019 | Salour | G05D 1/0246 |
| 2019/0202057 | A1* | 7/2019 | Smith | G06K 19/0614 |
| 2019/0265720 | A1* | 8/2019 | Gupta | G05D 1/0236 |
| 2020/0089237 | A1* | 3/2020 | Whitaker | G05D 1/0274 |
| 2020/0239232 | A1* | 7/2020 | Johnson | B25J 5/007 |
| 2020/0341470 | A1* | 10/2020 | Maeda | G01C 21/3822 |
| 2020/0401158 | A1* | 12/2020 | Kitano | G01C 3/16 |
| 2021/0094577 | A1* | 4/2021 | Shalev-Shwartz | G06V 20/584 |
| 2021/0114617 | A1* | 4/2021 | Phillips | B60W 30/0956 |
| 2021/0232146 | A1* | 7/2021 | Muro | G05D 1/0217 |
| 2022/0155789 | A1* | 5/2022 | Tadano | G01C 21/206 |

FOREIGN PATENT DOCUMENTS

| | | | | |
|---|---|---|---|---|
| CN | 107168316 | A | | 9/2017 |
| CN | 107727099 | A | | 2/2018 |
| CN | 107766965 | A | | 3/2018 |
| CN | 107806872 | A | | 3/2018 |
| CN | 108629531 | A | | 10/2018 |
| CN | 109335713 | A | | 2/2019 |
| CN | 109596132 | A | | 4/2019 |
| CN | 109597385 | A | | 4/2019 |
| CN | 106647734 | B | * 11/2020 | ........... G05D 1/0274 |
| JP | 2009015684 | A | | 1/2009 |
| JP | 2018508087 | A | | 3/2018 |
| JP | 2018112830 | A | | 7/2018 |

OTHER PUBLICATIONS

Search Report issued on May 15, 2020, corresponding to International Application No. PCT/CN2020/080866 (including English translation of International Search Report—Documents Considered to be Relevant).

"Communication with Supplementary European Search Report", EP Application No. 20809060.5, May 26, 2023, 11 pp.

Zhang, Yuanxing, et al., "SIGN: War-driving Free Indoor Navigation Using Coded Visual Tags", 2018 IEEE Global Communications Conference (GLOBECOM), Dec. 9, 2018, 6 pp.

"Notice of Reasons for Rejection" with English language translation, JP Application No. 2021-568594, Apr. 1, 2024, 6 pp.

* cited by examiner

UNMANNED VEHICLE PATH CONTROL METHOD, APPARATUS, AND SYSTEM

CROSS-REFERENCE TO RELATED APPLICATIONS

The present application is a U.S. National Stage Application under 35 U.S.C. § 371 of International Patent Application No. PCT/CN2020/080866, filed on Mar. 24, 2020, which is based on and claims priority from CN application No. 201910411149.1, filed on May 17, 2019, the disclosure of both of which are hereby incorporated into this disclosure by reference in its entirety

TECHNICAL FIELD

The disclosure relates to the field of path planning, and in particular relates to a method, a device and a system for controlling a path of an unmanned vehicle.

BACKGROUND

In the prior art, automated equipment such as unmanned vehicles have been widely used in warehouse management and production. By providing one-way landmarks on a lane between adjacent shelves and the main road convenient for the unmanned vehicle to pass through, and it can be ensured that the unmanned vehicle moves in a preset path by identifying the one-way landmarks.

SUMMARY

According to a first aspect of an embodiment of the present disclosure, there is provided a method for controlling a path of an unmanned vehicle, comprising: querying a current position and a target position of the unmanned vehicle; performing path planning according to the current position, the target position and advancing directions indicated by landmarks disposed on two sides of roads to obtain a planned path with a minimum path cost, wherein the unmanned vehicle moves forward on a predetermined side of a road; and transmitting the planned path to the unmanned vehicle, thereby the unmanned vehicle reaching the target position according to the planned path.

In some embodiments, the performing path planning according to the current position, the target position and advancing directions indicated by landmarks disposed on two sides of the roads comprises: determining whether the current position and the target position are both located in a first lane in the roads; determining whether the unmanned vehicle can reach the target position by moving straight forward without turning around according to an advancing direction indicated by a landmark corresponding to the current position under a condition that the current position and the target position are both located in a first lane; and planning a first path according to the current position, the target position and an advancing direction indicated by the landmark disposed on the predetermined side of the first lane under a condition that the unmanned vehicle can reach the target position by moving straight forward without turning around, thereby the unmanned vehicle moving straight forward from the current position to reach the target position according to the first path.

In some embodiments, detecting a type of the landmark corresponding to the current position under a condition that the unmanned vehicle reaches the target position by turning around; and planning a second path according to the current position, the target position and advancing directions indicated by the landmarks disposed on two sides of the first lane under a condition that the type of the landmark corresponding to the current position is a first-type of the landmark, thereby the unmanned vehicle turning around at the current position to reach the target position according to the second path, wherein the first-type of the landmark comprises a first advancing direction for turning around.

In some embodiments, determining a turning-around position according to the current position, the target position and the advancing direction of the landmark corresponding to the current position under a condition that the type of the landmark corresponding to the current position is a second-type of the landmark, thereby the unmanned vehicle directly reaching the target position, or moving straight forward to reach the target position, after turning around from the turning-around position to another side of the lane, wherein the second-type of the landmark comprises a second advancing direction for moving straight forward and a third advancing direction for turning around; determining whether the turning-around position coincides with the current position; and planning a third path according to the current position, the target position and the advancing directions indicated by landmarks disposed on two sides of the first lane under a condition that the turning-around position coincides with the current position, thereby the unmanned vehicle turning around at the current position to reach the target position according to the third path.

In some embodiments, planning a fourth path according to the current position, the turning-around position, the target position, and the advancing directions indicated by the landmarks disposed on two sides of the first lane under a condition that the turning-around position does not coincide with the current position, thereby the unmanned vehicle moving straight forward from the current position to the turning-around position and turning around at the turning-around position to reach the target position according to the fourth path.

In some embodiments, selecting a first lane opening corresponding to the current location and a second lane opening corresponding to the target location according to the current location and the target location under a condition that the current location is within the first lane and the target location is within a second lane in the roads, wherein a lane opening is an intersection area between an exit of a corresponding lane and a main road in the roads; and planning a fifth path according to the current position, the target position, advancing directions indicated by the landmarks disposed in the first lane opening, the advancing directions indicated by the landmarks disposed at two sides of the first lane and the advancing directions indicated by the landmarks disposed at two sides of the second lane under a condition that the first lane opening coincides with the second lane opening, thereby the unmanned vehicle entering the first lane opening from the current position, moving straight forward to pass through the first lane opening and entering the second lane to reach the target position according to the fifth path.

In some embodiments, planning a sixth path according to the current position, the target position, the advancing directions indicated by the landmarks disposed in the first lane opening, advancing directions indicated by landmarks disposed in the second lane opening, advancing directions indicated by landmarks disposed on two sides of a first main road between the first lane opening and the second lane opening, the advancing directions indicated by the landmarks disposed on two sides of the first lane, and advancing directions indicated by landmarks disposed on two sides of the second lane under a condition that the first lane opening does not coincide with the second lane opening, thereby the unmanned vehicle entering the first lane opening from the current position, turning from the first lane opening into the first main road, entering the second lane opening from the first main road, and entering the second lane from the second lane opening to reach the target position according to the sixth path.

In some embodiments, selecting a third lane opening corresponding to the target position according to the current position and the target position under a condition that the current position is within a second main road in the roads and the target position is within in a third lane in the roads; and planning a seventh path according to the current position, the target position, advancing directions indicated by the landmarks disposed at two sides of the second main road, advancing directions indicated by the landmarks disposed in the third lane opening and advancing directions indicated by the landmarks disposed at two sides of the third lane, thereby the unmanned vehicle entering the third lane opening from the current position and entering the third lane from the third lane opening to reach the target position according to the seventh path.

In some embodiments, each lane opening includes four third-type landmarks, each third-type landmark comprises a fourth advancing direction for moving straight forward and a fifth advancing direction for turning around, the unmanned vehicle can cyclically move between positions corresponding to the four third-type landmarks in each lane opening.

In some embodiments, controlling the unmanned vehicle to reach a first position corresponding to a first landmark in a predetermined lane opening under a condition that the unmanned vehicle moving straight forward through a predetermined lane opening; controlling the unmanned vehicle to move straight forward from the first position to reach a second position corresponding to a second landmark in the predetermined lane opening; and controlling the unmanned vehicle to move straight forward from the second position to pass through the predetermined lane opening.

In some embodiments, controlling the unmanned vehicle to reach a first position corresponding to the first landmark in the predetermined lane opening under a condition that the unmanned vehicle turning to a predetermined side through a predetermined lane opening; and controlling the unmanned vehicle to turn from the first position to the predetermined side, thereby the unmanned vehicle turning to the predetermined side through the predetermined lane opening.

In some embodiments, controlling the unmanned vehicle to reach a first position corresponding to the first landmark in the predetermined lane opening under a condition that the unmanned vehicle turning to an opposite side of the predetermined side through a predetermined lane opening; controlling the unmanned vehicle to move straight forward from the first position to reach a second position corresponding to the second landmark in the predetermined lane opening; controlling the unmanned vehicle to turn from the second position to the opposite side of the predetermined side to reach a third position corresponding to a third landmark in a predetermined lane opening; and controlling the unmanned vehicle to move straight forward from the third position, thereby the unmanned vehicle turning to an opposite side of the predetermined side through the predetermined lane opening.

In some embodiments, the querying the current position of the unmanned vehicle comprises: determining the current position of the unmanned vehicle according to a landmark information on the current position of the unmanned vehicle.

According to a second aspect of the embodiments of the present disclosure, there is provided an apparatus for controlling a path of an unmanned vehicle, comprising: a memory configured to store instructions; a processor coupled to the memory, wherein based on the instructions stored in the memory, the processor is configured to implement: query a current position and a target position of the unmanned vehicle; perform path planning according to the current position, the target position and advancing directions indicated by landmarks disposed on two sides of roads to obtain a planned path with a minimum path cost, wherein the unmanned vehicle moves forward on a predetermined side of a road; and transmit the planned path to the unmanned vehicle, thereby the unmanned vehicle reaching the target position according to the planned path.

According to a third aspect of the embodiments of the present disclosure, there is provided an system for controlling a path of an unmanned vehicle, comprising: an apparatus for controlling a path of an unmanned vehicle according to any one of the embodiments described above, and an unmanned vehicle, configured to transmit landmark information on a current position to the apparatus, thereby the apparatus planning a path from the current position to a target position of the unmanned vehicle, and configured to move to the target position according to a planned path transmitted by the apparatus.

In some embodiments, the unmanned vehicle is further configured to identify landmark information of landmarks disposed on two sides of roads during moving to the target position according to the planned path, compare identified landmark information with the planned path, and transmit the landmark information at the current position to the apparatus under a condition that the identified landmark information does not consistent with the planned path, thereby the apparatus replanning a path from the current position to the target position.

According to a fourth aspect of the embodiments of the present disclosure, there is provided a non-transitory computer-readable storage medium, wherein the computer readable storage medium stores computer instructions which, when executed by a processor, cause the processor to implement: query a current position and a target position of the unmanned vehicle; perform path planning according to the current position, the target position and advancing directions indicated by landmarks disposed on two sides of roads to obtain a planned path with a minimum path cost, wherein the unmanned vehicle moves forward on a predetermined side of a road; and transmit the planned path to the unmanned vehicle, thereby the unmanned vehicle reaching the target position according to the planned path.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. Apparently, the drawings in the following description are only some of the embodiments of the present disclosure, and for those skilled in the art, other drawings may be obtained according to the drawings without paying inventive effort.

DETAILED DESCRIPTION

The technical solutions in the embodiments of the present disclosure will be described clearly and completely with reference to the drawings in the embodiments of the present disclosure, and it is obvious that the embodiments described are only some, instead of all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without inventive step, are intended to be within the scope of the present disclosure.

The relative arrangement of parts and steps, numerical expressions and values set forth in these embodiments do not limit the scope of the present disclosure unless specifically stated otherwise.

Meanwhile, it should be understood that the sizes of the respective portions shown in the drawings are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that similar reference signs and letters refer to similar items in the following figures, and thus, once an item is defined in one figure, it need not be discussed further in subsequent figures.

The inventors found through research that congestion is likely to occur because only one-way landmarks are provided on the lanes and the main roads, i.e., unmanned vehicles traveling in different directions use the same landmark. At the lane exit, there are lots of unmanned vehicles moving straight forward, turning left or turning right, which intensifies the condition of traffic jam and seriously affects working efficiency.

To this end, the present disclosure provides an unmanned vehicle path control scheme that reduces congestion conditions.

Figure 1:
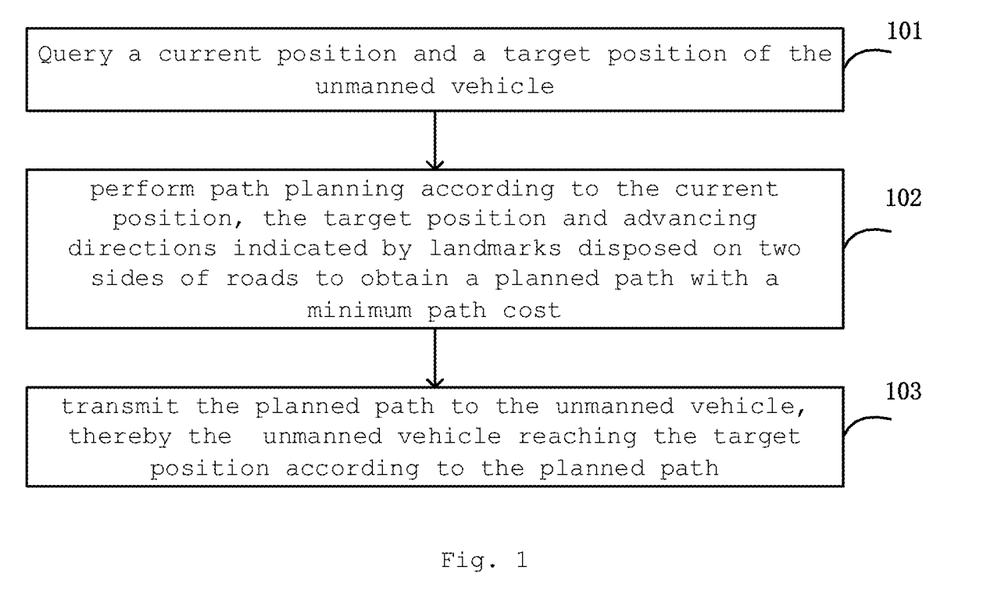
FIG. 1 is a schematic flow chart of a method for controlling a path of an unmanned vehicle according to one embodiment of the present disclosure.

FIG. 1 is a schematic flow chart of a method for controlling a path of an unmanned vehicle according to one embodiment of the present disclosure. In some embodiments, the following steps of the method for controlling the path of the unmanned vehicle are performed by an apparatus for controlling the path of the unmanned vehicle.

In step 101, a current position and a target position of the unmanned vehicle are queried.

In some embodiments, the current position of the unmanned vehicle is determined based on landmark information on the current position of the unmanned vehicle.

In step 102, path planning is performed according to the current position, the target position and advancing directions indicated by landmarks disposed on two sides of roads to obtain a planned path with a minimum path cost, wherein the unmanned vehicle moves forward on a predetermined side of a road.

Figure 2:
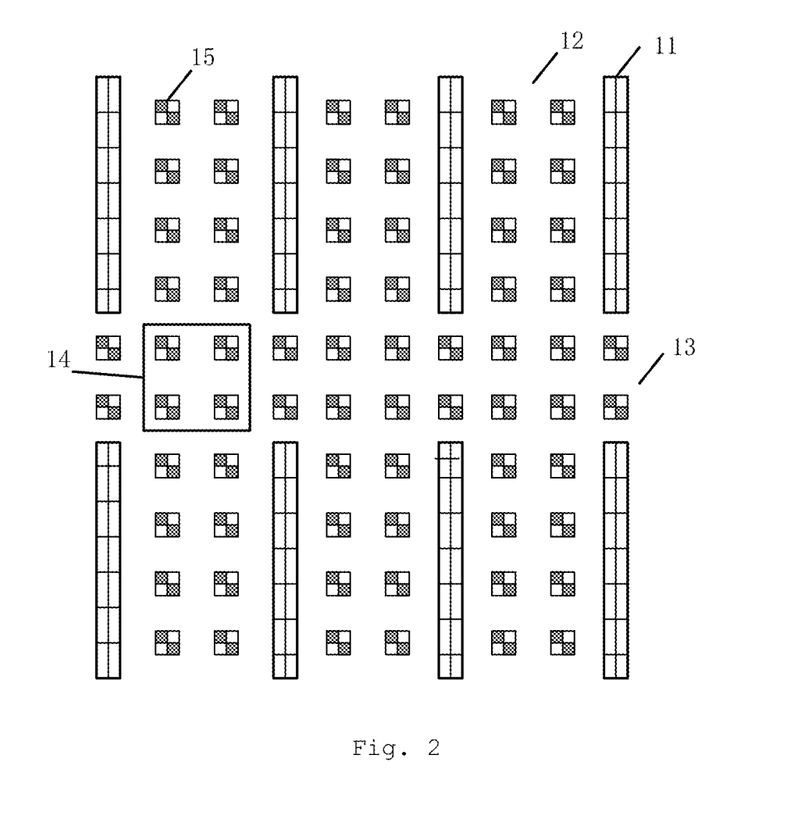
FIG. 2 is a schematic diagram of an application scenario of one embodiment of the present disclosure.

FIG. 2 is a schematic diagram of an application scenario according to an embodiment of the present disclosure. Here, the roads on which the unmanned vehicle passes is a bidirectional road, and landmarks indicating the moving direction of the unmanned vehicle are disposed on two sides of the road. The unmanned vehicle approaches a predetermined side of the road when moving forward, for example, the unmanned vehicle always approaches the right side of the road when moving forward. The roads comprises lanes and main roads, the lane is disposed between the adjacent shelves, and an intersection area between the exit of a lane and a main road is the lane opening.

As shown in FIG. 2, a road between adjacent shelves 11 is a lane 12. The intersection between the exit of the lane 12 and the main road 13 is a lane opening 14. The lane 12 and the main road 13 are provided with landmarks 15 for the two-way moving of an unmanned vehicle.

In step 103, the planned path is transmitted to the unmanned vehicle, thereby the unmanned vehicle reaching the target position according to the planned path.

In the method for controlling the path of the unmanned vehicle provided by the above embodiment of the disclosure, the lanes and the main roads in the warehouse are both set as bidirectional roads, so that the unmanned vehicles in different moving directions can conveniently move on different roads, and the road congestion is effectively reduced.

Figure 3:
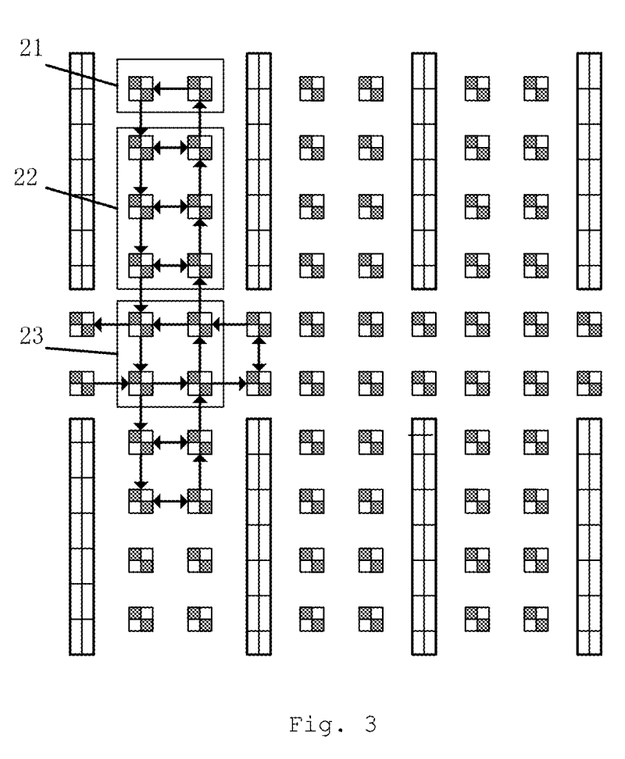
FIG. 3 is a schematic diagram of an application scenario of another embodiment of the present disclosure.

FIG. 3 is a schematic diagram of an application scenario of another embodiment of the present disclosure. As shown in FIG. 3, there are three types of landmarks provided on the lanes and the main roads. For simplicity, only part of the landmark types are labeled in FIG. 3.

The landmarks contained in the box 21 are first-type landmarks, also called two-way landmarks.

A two-way landmark, i.e. an edge landmark, has only two landmarks adjacent to it. The two-way landmark includes an inlet direction and a forward direction. That is, of the two landmarks adjacent to the two-way landmark, the unmanned vehicle moves from the position corresponding to one of the adjacent landmarks to the position corresponding to the two-way landmark along the inlet direction, and moves from the position corresponding to the two-way landmark to the position corresponding to the other adjacent landmark along the forward direction.

For example, the format information of the two-way landmark is: [X, Y, landmark KEY, Up_NONE_NONE, Down_Inlet_landmark KEY, Left_Outlet_landmark KEY, Right_NONE_NONE], where X, Y represents coordinates of a two-way landmark, the landmark KEY is related information of the landmark, and the up, lower, left or right represents adjacent positions, the Down_Inlet_landmark KEY indicates that an unmanned vehicle can move from a position corresponding to a landmark located below the two-way landmark to a position corresponding to the two-way landmark, and the Left_Outlet_landmark KEY indicates that the unmanned vehicle can move from the position corresponding to the two-way landmark to a position corresponding to the adjacent landmark to the left.

Since the inlet and outlet of a two-way landmark are both unidirectional, and the unmanned vehicle on the two-way landmark has only one advancing direction, the unmanned vehicle thereby passes the position corresponding to the two-way landmark in accordance with the advancing direction.

The landmarks included in box 22 are landmarks of a second-type, also known as three-way landmarks.

The three-way landmarks have three adjacent landmarks. A three-way landmark includes an inlet direction, a second advancing direction for moving straight forward, and a third advancing direction for turning around. The unmanned vehicle can move from the position corresponding to the first adjacent landmark to the position corresponding to the current three-way landmark, and can move forward from the position corresponding to the current three-way landmark to the position corresponding to the second adjacent landmark. In addition, the unmanned vehicle is also able to traverse between a location corresponding to the current three-way landmark and a location corresponding to a third adjacent landmark (also a three-way landmark).

For example, the format information of the three-way landmark is: [X, Y, Landmark KEY, Up_Inlet_Landmark KEY, Down_Outlet_Landmark KEY, Left_NONE_NONE, Right_Inlet/Outlet_Landmark KEY].

Since the inlet and the outlet of the three-way landmark are both bidirectional, the unmanned vehicle can turn around when needed.

The landmarks included in box 23 are landmarks of a third-type, also known as four-way landmarks.

The lane opening can be regarded as a crossroad, and four four-way landmarks are disposed in each lane opening. The four-way landmark includes two inlet directions, a fourth advancing direction for moving straight forward and a fifth advancing direction for turning around. The unmanned vehicle is able to cyclically move between positions corresponding to the four landmarks in each lane opening. The four-way landmark has four adjacent landmarks at the up, down, left and right sides, and the unmanned vehicle can move to the position corresponding to the adjacent landmark of the current four-way landmark through the positions corresponding to the two adjacent landmarks and also can move to the positions corresponding to the other two adjacent landmarks from the position corresponding to the current four-way landmark.

For example, the format information of the four-way landmark is: [X, Y, Landmark KEY, Up_Inlet_Landmark KEY, Down_Outlet_Landmark KEY, left_Outlet_Landmark KEY, Right_Inlet_Landmark KEY].

As shown in FIG. 3, in a lane opening, four four-way landmarks can form a counterclockwise cycle, so that the unmanned vehicle can realize various direction adjustments at the lane opening, and the occurrence of congestion can be effectively avoided.

Figure 4:
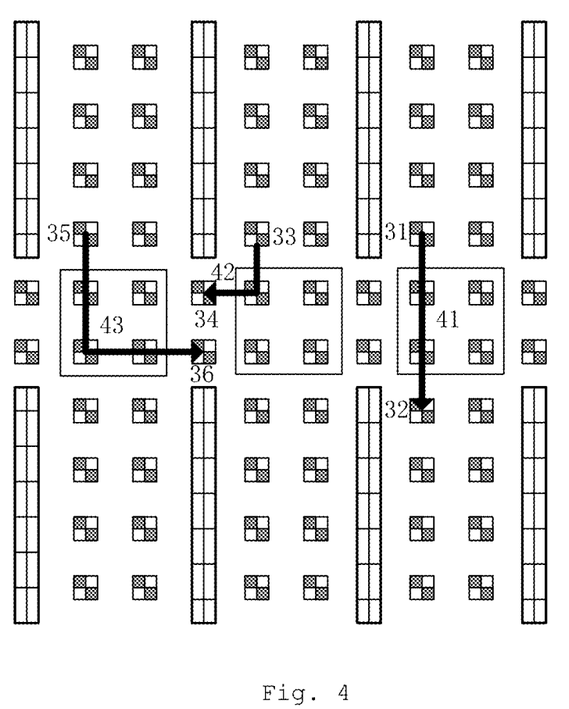
FIG. 4 is a schematic illustration of an application scenario of still another embodiment of the present disclosure.

FIG. 4 is a schematic diagram of an application scenario of another embodiment of the present disclosure.

As shown on the right side of FIG. 4, in a case where an unmanned vehicle needs to move straight through a lane opening, the unmanned vehicle first arrives at a first position corresponding to a first landmark in the lane opening from a landmark 31. The unmanned vehicle continues to move straight from the first position to a second position corresponding to a second landmark in the lane opening. The unmanned vehicle continues to move straight from the second position to reach the location of the landmark 32 to realize straight through the lane opening. The corresponding path is shown as path 41.

As shown in the middle of FIG. 4, in a case where an unmanned vehicle needs to turn right through a lane opening, the unmanned vehicle first arrives at a first position corresponding to a first landmark in the lane opening from the landmark 33. The unmanned vehicle turns to the right from the first position to reach the location of the landmark 34 to realize a right turn through the lane opening. The corresponding path is shown as path 42.

As shown on the left side of FIG. 4, in a case where an unmanned vehicle needs to turn to the left through a lane opening, the unmanned vehicle first arrives at a first position corresponding to a first landmark in the lane opening from a landmark 35. The unmanned vehicle continues to move straight from the first position to a second position corresponding to a second landmark in the lane opening. The unmanned vehicle turns left from the second position and reaches a third position corresponding to a third landmark in the lane opening. The unmanned vehicle continues to move straight from the third position to reach the location of the landmark 36 to realize a left turn through the lane opening. The corresponding path is shown as path 43.

Figure 5:
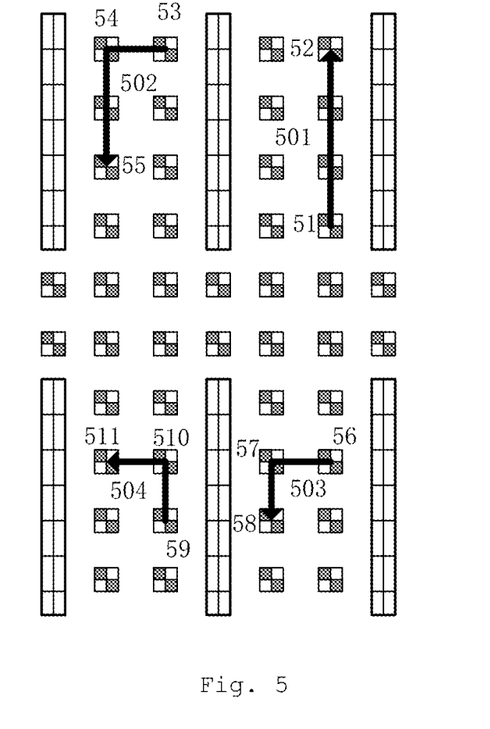
FIG. 5 is a schematic illustration of an application scenario of still another embodiment of the present disclosure.

FIG. 5 is a schematic diagram of an application scenario of another embodiment of the present disclosure.

As shown in FIG. 5, in some embodiments, a first path is planned according to the current position, the target position and an advancing direction indicated by the landmark disposed on the predetermined side of the lane under a condition that the current position and the target position are both located in a same lane, and the unmanned vehicle can reach the target position by moving straight forward without turning around, thereby the unmanned vehicle moving straight forward from the current position to reach the target position according to the first path.

As shown in the upper right portion of FIG. 5, the unmanned vehicle needs to move from a position corresponding to the landmark 51 to a position corresponding to the landmark 52. Since the unmanned vehicle moves straight ahead to reach the target position, the path 501 can be planned directly between the landmark 51 and the landmark 52.

In some embodiments, a type of the landmark corresponding to the current position is detected under a condition that the current position and the target position are located in the same lane and the unmanned vehicle can reach the target position by turning around. If the type of the landmark corresponding to the current position is a two-way landmark, the unmanned vehicle must turn around. A second path is planned according to the current position, the target position and advancing directions indicated by the landmarks disposed on two sides of the lane, thereby the unmanned vehicle turning around at the current position to reach the target position according to the second path.

As shown in the upper left portion of FIG. 5, the unmanned vehicle needs to move from a position corresponding to the landmark 53 to a position corresponding to the landmark 55. Since the landmark 53 is a two-way landmark, the unmanned vehicle must turn around to reach the target location, therefore a path 502 can be planned between the landmark 53, the landmark 54, and the landmark 55.

In some embodiments, the current position and the target position are located in the same lane, and the unmanned vehicle reaches the target position by turning around. A turning-around position is determined according to the current position and the target position under a condition that the type of the landmark corresponding to the current position is a three-way landmark, wherein the unmanned vehicle can directly reach the target position, or move straight forward to reach the target position, after turning around from the turning-around position to another side of the lane. A third path is planned according to the current position, the target position and the advancing directions indicated by landmarks disposed on two sides of the lane under a condition that the turning-around position coincides with the current position, thereby the unmanned vehicle turning around at the current position to reach the target position according to the third path. A fourth path is planned according to the current position, the turning-around position, the target position, and the advancing directions indicated by the landmarks disposed on two sides of the lane under a condition that the turning-around position does not coincide with the current position, thereby the unmanned vehicle moving straight forward from the current position to the turning-around position and turning around at the turning-around position to reach the target position according to the fourth path.

As shown in the lower right portion of FIG. 5, the landmark 56 and the landmark 58 are located on two sides of the road, and the unmanned vehicle needs to turn around to reach the location of the landmark 58. Because the unmanned vehicle can reach the landmark 58 by turning around at the landmark 56 where the unmanned vehicle is currently located, and the landmark 56 is a three-way landmark, the path 503 can be planned between the landmark 56, the landmark 57 and the landmark 58.

In the lower left portion of FIG. 5, landmark 59 and landmark 511 are located on two sides of the road, and the unmanned vehicle needs to turn around to reach the location of landmark 511. Although the landmark 59 is a three-way landmark, the unmanned vehicle cannot reach the landmark 511 after turning around at the landmark 59. Therefore, the unmanned vehicle needs to move to landmark 510 firstly. The landmark 510 is also a three-way landmark, therefore the unmanned vehicle can turn around from landmark 510 to reach landmark 511. Path 504 may thus be planned between landmark 59, landmark 510, and landmark 511.

Figure 6:
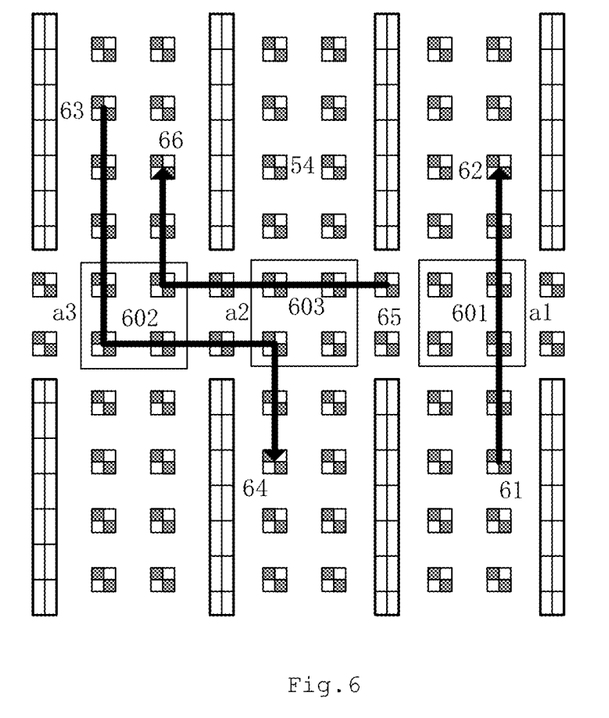
FIG. 6 is a schematic illustration of an application scenario of still another embodiment of the present disclosure.

FIG. 6 is a schematic diagram of an application scenario of another embodiment of the present disclosure.

In some embodiments, as shown in FIG. 6, the current position is located in a first lane and the target position is located in a second lane, a first lane opening corresponding to the current position and a second lane opening corresponding to the target position are selected according to the current position and the target position. A fifth path is planned according to the current position, the target position, advancing directions indicated by the landmarks disposed in the first lane opening, the advancing directions indicated by the landmarks disposed at two sides of the first lane and the advancing directions indicated by the landmarks disposed at two sides of the second lane under a condition that the first lane opening coincides with the second lane opening, thereby the unmanned vehicle entering the first lane opening from the current position, moving straight forward to pass through the first lane opening and entering the second lane where the targe position is located to reach the target position according to the fifth path.

As shown in the right part of FIG. 6, the unmanned vehicle needs to move from a position corresponding to the landmark 61 to a position corresponding to the landmark 62. Since the lane opening for leaving the lane where the landmark 61 is located is the same lane opening for entering the lane where the landmark 62 is located, path 601 can be planned using landmark 61, lane opening a1 and landmark 62.

In some embodiments, upon selection of a first lane opening corresponding to the current location and a second lane opening corresponding to the target location, a sixth path is planned according to the current position, the target position, the advancing directions indicated by the landmarks disposed in the first lane opening, advancing directions indicated by landmarks disposed in the second lane opening, advancing directions indicated by landmarks disposed on two sides of a main road between the first lane opening and the second lane opening, the advancing directions indicated by the landmarks disposed on two sides of the first lane, and advancing directions indicated by landmarks disposed on two sides of the second lane under a condition that the first lane opening does not coincide with the second lane opening, thereby the unmanned vehicle entering the first lane opening from the current position, turning from the first lane opening into the second lane opening, and entering the second lane from the second lane opening to reach the target position according to the sixth path.

As shown in the left part of FIG. 6, the unmanned vehicle needs to move from a position corresponding to the landmark 63 to a position corresponding to the landmark 64. Since a lane opening a3 for leaving the lane where the landmark 63 is located is not the same as the lane opening a4 for entering the lane were the landmark 64 is located, path 602 can be planned using landmark 63, lane opening a3, lane opening a2 and landmark 64.

In some embodiments, a third lane opening corresponding to the target position is selected according to the current position and the target position under a condition that the current position is within a main road in the roads and the target position is within in a third lane. A seventh path is planned according to the current position, the target position, advancing directions indicated by the landmarks disposed at two sides of the main road, advancing directions indicated by the landmarks disposed in the third lane opening and advancing directions indicated by the landmarks disposed at two sides of the third lane, thereby the unmanned vehicle entering the third lane opening from the current position and entering the third lane from the third lane opening to reach the target position according to the seventh path.

As shown in the left portion of FIG. 6, the unmanned vehicle needs to move from landmark 65 to landmark 66. Landmark 65 is located on the main road. The unmanned vehicle moves to the landmark 66 according to the landmark 65, and selects a lane opening a2 corresponding to the landmark 66. Path 603 is thus planned depending on landmark 65, lane opening a2 and landmark 66.

Figure 7:
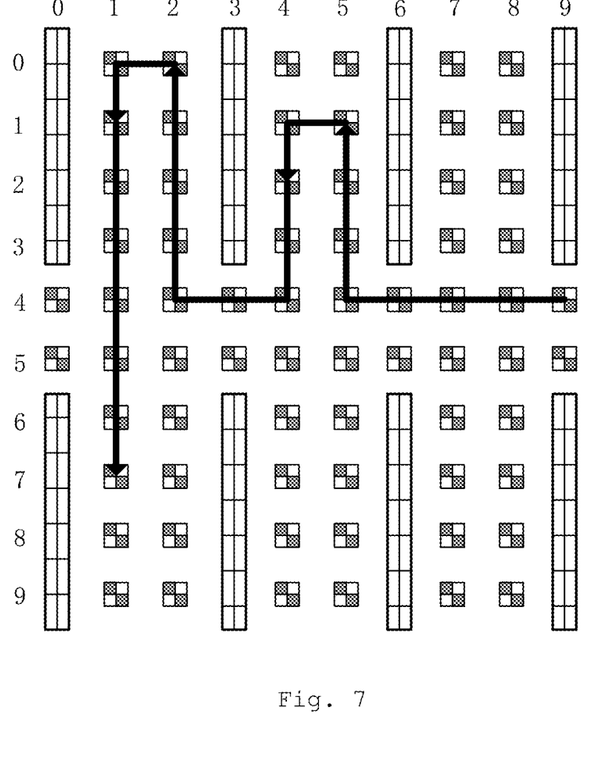
FIG. 7 is a schematic illustration of an application scenario of still another embodiment of the present disclosure.

FIG. 7 is a schematic diagram of an application scenario of still another embodiment of the present disclosure. As shown in FIG. 7, the unmanned vehicle is initially located at the position corresponding to the landmark with coordinates (9, 4), and needs to sequentially reach the positions corresponding to the landmarks with coordinates (5, 1), (4, 2), (2, 0) , (1, 1), and (1, 7).

According to the embodiments of FIGS. 1 to 6, in the process that the unmanned vehicle arrives at the landmark with the coordinates (5, 1) from the landmark with the coordinates (9, 4), the corresponding information of the landmarks it passes is as follows:

[9, 4, KEY/9/4, Up_NONE_NONE, Down_Inlet KEY/9/5, Left_Outlet_KEY/8/5, Right_NONE_NONE ];

[8, 4, KEY/8/4, Up_Outlet_KEY/8/3, Down_Inlet_KEY/8/5, Left_Outlet_KEY/7/4, Right_Inlet_KEY/9/4];

. . .

[5, 2, KEY/5/2, Up_Outlet_KEY/5/1, Down_Inlet_KEY/5/3, Left_Inlet/Outlet_KEY/4/2, Right_NONE_NONE];

[5, 1, KEY/5/1, Up_Outlet_KEY/5/0, Down_Inlet_KEY/5/2, Left_Inlet/Outlet_KEY/4/1, Right_NONE_NONE].

Accordingly, after the unmanned vehicle reaches the landmark with the coordinates (5, 1), the landmarks with the coordinates (4, 2), (2, 0), (1, 1) and (1, 7) may also be reached sequentially according to the embodiments of FIGS. 1 to 6.

Figure 8:
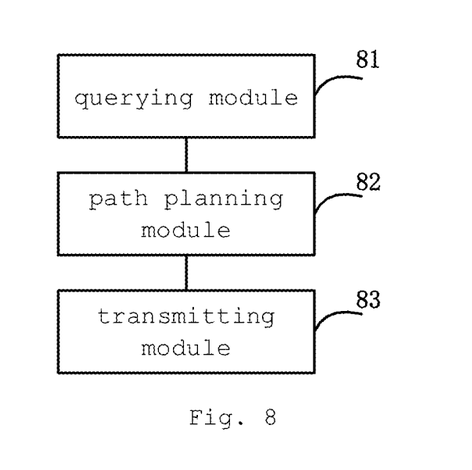
FIG. 8 is a schematic structural view of an apparatus for controlling a path of an unmanned vehicle according to one embodiment of the present disclosure.

FIG. 8 is a schematic structural view of an apparatus for controlling a path of an unmanned vehicle according to one embodiment of the present disclosure. As shown in FIG. 8, the apparatus includes an querying module 81, a path planning module 82, and a transmitting module 83.

The querying module 81 is configured to query a current position and a target position of the unmanned vehicle.

The path planning module 82 is configured to perform path planning according to the current position, the target position and advancing directions indicated by landmarks disposed on two sides of the roads to obtain a planned path with a minimum path cost, wherein the unmanned vehicle moves forward on a predetermined side of a road.

In some embodiments, the path planning module 82 performs path planning according to the embodiments illustrated in FIGS. 2-7.

The sending module 83 is configured to transmit the planned path to the unmanned vehicle, thereby the unmanned vehicle reaching the target position according to the planned path.

In the apparatus for controlling the path of the unmanned vehicle provided by the above embodiment of the present disclosure, the lane and the main road in the warehouse are both set as bidirectional roads, so that unmanned vehicles in different moving directions can move on different roads, and the road congestion is effectively reduced.

Figure 9:
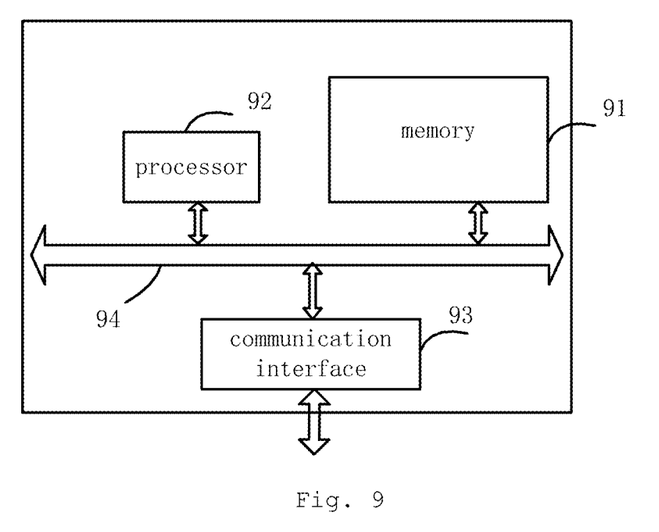
FIG. 9 is a schematic structural view of an apparatus for controlling a path of an unmanned vehicle according to another embodiment of the present disclosure.

FIG. 9 is a schematic structural view of an apparatus for controlling the path of the unmanned vehicle according to another embodiment of the present disclosure. As shown in FIG. 9, the apparatus includes a memory 91 and a processor 92.

The memory 91 is used for storing instructions, the processor 92 is coupled to the memory 91, and the processor 92 is configured to execute the method according to any one of FIGS. 1 to 7 based on the instructions stored in the memory.

As shown in FIG. 9, the apparatus for controlling the path of the unmanned vehicle further includes a communication interface 93 for information interaction with other devices. Meanwhile, the apparatus for controlling the path of the unmanned vehicle further comprises a bus 94, and the processor 92, the communication interface 93 and the memory 91 communicate with each other through the bus 94.

The memory 91 may comprise high-speed RAM memory, and may also include non-volatile memory, such as at least one disk memory. The memory 91 may also be a memory array. The storage 91 may also be partitioned and the blocks may be combined into virtual volumes according to certain rules.

Further, the processor 92 may be a central processing unit CPU, or may be an application specific integrated circuit ASIC, or one or more integrated circuits configured to implement embodiments of the present disclosure.

The present disclosure also relates to a computer-readable storage medium, in which computer instructions are stored, and when executed by a processor, the instructions implement the method according to any one of FIGS. 1 to 7.

Figure 10:
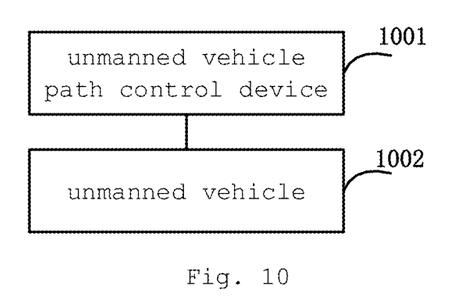
FIG. 10 is a schematic structural view of an system for controlling a path of an unmanned vehicle according to another embodiment of the present disclosure.

FIG. 10 is a schematic structural view of an system for controlling a path of a unmanned vehicle according to an embodiment of the present disclosure. As shown in FIG. 10, the apparatus for controlling the path of the unmanned vehicle includes an unmanned vehicle path control device 1001 and an unmanned vehicle 1002. The unmanned vehicle path control device 1001 is the apparatus for controlling the path of the unmanned vehicle according to any one of the embodiments of FIGS. 8 and 9.

The unmanned vehicle 1002 is configured to provide landmark information on a current location to the unmanned vehicle path control device 1001, so that the unmanned vehicle path control device 1001 plans a path of the unmanned vehicle 1002 from the current location to the target location. After receiving the planned path transmitted by the unmanned vehicle path control device 1001, the unmanned vehicle 1002 travels to the target position according to the planned path.

In some embodiments, the unmanned vehicle 1002 is further configured to identify landmark information set on a road during moving to the target location according to the planned path, and compare the identified landmark information with the planned path. If the recognized landmark information does not coincide with the planned path, the unmanned vehicle 1002 transmits the landmark information on the current position to the unmanned vehicle path control device 1001, so that the unmanned vehicle path control device 1001 replans the path from the current position to the target position of the unmanned vehicle 1002.

In some embodiments, the functional unit modules described above can be implemented as a general purpose Processor, a Programmable Logic Controller (PLC), a Digital Signal Processor (Digital Signal Processor, DSP), an Application Specific Integrated Circuit (ASIC), a Field Programmable Gate Array (FPGA) or other Programmable Logic device, discrete Gate or transistor Logic, discrete hardware components, or any suitable combination thereof for performing the functions described in this disclosure.

It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

The description of the present disclosure has been presented for purposes of illustration and description, and is not intended to be exhaustive or limited to the disclosure in the form disclosed. Many modifications and variations will be apparent to practitioners skilled in this art. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for controlling a path of an unmanned vehicle, comprising:
    querying a current position and a target position of the unmanned vehicle;
    performing path planning according to the current position, the target position and advancing directions indicated by landmarks disposed on two sides of roads to obtain a planned path with a minimum path cost, wherein the unmanned vehicle moves forward on a predetermined side of a road; and
    transmitting the planned path to the unmanned vehicle, thereby the unmanned vehicle reaching the target position according to the planned path,
    wherein the performing path planning according to the current position, the target position and the advancing directions indicated by the landmarks disposed on the two sides of the roads comprises:
    determining whether the current position and the target position are both located in a first lane in the roads;
    determining whether the unmanned vehicle can reach the target position by moving straight forward without turning around according to an advancing direction indicated by a landmark corresponding to the current position under a condition that the current position and the target position are both located in the first lane;
    detecting a type of the landmark corresponding to the current position under a condition that the unmanned vehicle reaches the target position by turning around;
    determining a turning-around position according to the current position, the target position and the advancing direction of the landmark corresponding to the current position under a condition that the type of the landmark corresponding to the current position is a second-type of the landmark, thereby the unmanned vehicle directly reaching the target position, or moving straight forward to reach the target position, after turning around from the turning-around position to an other side of the lane, wherein the second-type of the landmark comprises a second advancing direction for moving straight forward and a third advancing direction for turning around;
    determining whether the turning-around position coincides with the current position;
    planning a third path according to the current position, the target position and the advancing directions indicated by the landmarks disposed on the two sides of the first lane under a condition that the turning-around position coincides with the current position, thereby the unmanned vehicle turning around at the current position to reach the target position according to the third path; and
    planning a fourth path according to the current position, the turning-around position, the target position, and the advancing directions indicated by the landmarks disposed on the two sides of the first lane under a condition that the turning-around position does not coincide with the current position, thereby the unmanned vehicle moving straight forward from the current position to the turning-around position and turning around at the turning-around position to reach the target position according to the fourth path.

2. The method according to claim 1, wherein the performing path planning according to the current position, the target position and the advancing directions indicated by the landmarks disposed on the two sides of the roads comprises:
    planning a first path according to the current position, the target position and the advancing direction indicated by the landmark disposed on the predetermined side of the first lane under a condition that the unmanned vehicle can reach the target position by moving straight forward without turning around, thereby the unmanned vehicle moving straight forward from the current position to reach the target position according to the first path.

3. The method according to claim 2, wherein the performing path planning according to the current position, the target position and the advancing directions indicated by the landmarks disposed on the two sides of the roads comprises:
    planning a second path according to the current position, the target position and advancing directions indicated by landmarks disposed on two sides of the first lane under a condition that the type of the landmark corresponding to the current position is a first-type of the landmark, thereby the unmanned vehicle turning around at the current position to reach the target position according to the second path, wherein the first-type of the landmark comprises a first advancing direction for turning around.

4. The method according to claim 2, wherein the performing path planning according to the current position, the target position and the advancing directions indicated by the landmarks disposed on the two sides of the roads comprises:
    selecting a first lane opening corresponding to the current location and a second lane opening corresponding to the target location according to the current location and the target location under a condition that the current location is within the first lane and the target location is within a second lane in the roads, wherein a lane opening is an intersection area between an exit of a corresponding lane and a main road in the roads; and
    planning a fifth path according to the current position, the target position, advancing directions indicated by landmarks disposed on the first lane opening, the advancing directions indicated by landmarks disposed on two sides of the first lane and the advancing directions indicated by landmarks disposed on two sides of the second lane under a condition that the first lane opening coincides with the second lane opening, thereby the unmanned vehicle entering the first lane opening from the current position, moving straight forward to pass through the first lane opening and entering the second lane to reach the target position according to the fifth path.

5. The method according to claim 4, wherein the performing path planning according to the current position, the target position and the advancing directions indicated by the landmarks disposed on the two sides of the roads comprises:
    planning a sixth path according to the current position, the target position, the advancing directions indicated by the landmarks disposed on the first lane opening, advancing directions indicated by the landmarks disposed on the second lane opening, the advancing directions indicated by landmarks disposed on two sides of a first main road between the first lane opening and the second lane opening, the advancing directions indicated by the landmarks disposed on the two sides of the first lane, and the advancing directions indicated by the landmarks disposed on the two sides of the second lane under a condition that the first lane opening does not coincide with the second lane opening, thereby the unmanned vehicle entering the first lane opening from the current position, turning from the first lane opening into the first main road, entering the second lane opening from the first main road, and entering the second lane from the second lane opening to reach the target position according to the sixth path.

6. The method according to claim 2, wherein the performing path planning according to the current position, the target position and the advancing directions indicated by the landmarks disposed on the two sides of the roads comprises:
selecting a third lane opening corresponding to the target position according to the current position and the target position under a condition that the current position is within a second main road in the roads and the target position is within in a third lane in the roads; and
planning a seventh path according to the current position, the target position, advancing directions indicated by landmarks disposed on two sides of the second main road, advancing directions indicated by landmarks disposed on the third lane opening and advancing directions indicated by the landmarks disposed at on two sides of the third lane, thereby the unmanned vehicle entering the third lane opening from the current position and entering the third lane from the third lane opening to reach the target position according to the seventh path.

7. The method according to claim 6, wherein
each lane opening includes four third-type landmarks, each third-type landmark comprises a fourth advancing direction for moving straight forward and a fifth advancing direction for turning around, the unmanned vehicle can cyclically move between positions corresponding to the four third-type landmarks in each lane opening.

8. The method according to claim 7, wherein:
controlling the unmanned vehicle to reach a first position corresponding to a first landmark in a predetermined lane opening under a condition that the unmanned vehicle moving straight forward through a predetermined lane opening;
controlling the unmanned vehicle to move straight forward from the first position to reach a second position corresponding to a second landmark in the predetermined lane opening; and
controlling the unmanned vehicle to move straight forward from the second position to pass through the predetermined lane opening.

9. The method according to claim 7, wherein:
controlling the unmanned vehicle to reach a first position corresponding to a first landmark in a predetermined lane opening under a condition that the unmanned vehicle turning to a predetermined side through a predetermined lane opening; and
controlling the unmanned vehicle to turn from the first position to the predetermined side, thereby the unmanned vehicle turning to the predetermined side through the predetermined lane opening.

10. The method according to claim 7, wherein:
controlling the unmanned vehicle to reach a first position corresponding to a first landmark in a predetermined lane opening under a condition that the unmanned vehicle turning to an opposite side of a predetermined side through a predetermined lane opening;
controlling the unmanned vehicle to move straight forward from the first position to reach a second position corresponding to the second landmark in the predetermined lane opening;
controlling the unmanned vehicle to turn from the second position to the opposite side of the predetermined side to reach a third position corresponding to a third landmark in a predetermined lane opening; and
controlling the unmanned vehicle to move straight forward from the third position, thereby the unmanned vehicle turning to an opposite side of the predetermined side through the predetermined lane opening.

11. The method according to claim 1, wherein the querying the current position of the unmanned vehicle comprises:
determining the current position of the unmanned vehicle according to landmark information on the current position of the unmanned vehicle.

12. An apparatus for controlling a path of an unmanned vehicle, comprising:
a memory configured to store instructions;
a processor coupled to the memory, wherein based on the instructions stored in the memory, the processor is configured to:
query a current position and a target position of the unmanned vehicle;
perform path planning according to the current position, the target position and advancing directions indicated by landmarks disposed on two sides of roads to obtain a planned path with a minimum path cost, wherein the unmanned vehicle moves forward on a predetermined side of a road; and
transmit the planned path to the unmanned vehicle, thereby the unmanned vehicle reaching the target position according to the planned path,
wherein the perform path planning according to the current position, the target position and the advancing directions indicated by the landmarks disposed on the two sides of the roads comprises:
determine whether the current position and the target position are both located in a first lane in the roads;
determine whether the unmanned vehicle can reach the target position by moving straight forward without turning around according to an advancing direction indicated by a landmark corresponding to the current position under a condition that the current position and the target position are both located in the first lane;
detect a type of the landmark corresponding to the current position under a condition that the unmanned vehicle reaches the target position by turning around;
determine a turning-around position according to the current position, the target position and the advancing direction of the landmark corresponding to the current position under a condition that the type of the landmark corresponding to the current position is a second-type of the landmark, thereby the unmanned vehicle directly reaching the target position, or moving straight forward to reach the target position, after turning around from the turning-around position to an other side of the lane, wherein the second-type of the landmark comprises a second advancing direction for moving straight forward and a third advancing direction for turning around;
determine whether the turning-around position coincides with the current position;
plan a third path according to the current position, the target position and the advancing directions indicated by the landmarks disposed on the two sides of the first lane under a condition that the turning-around position coincides with the current position, thereby the unmanned vehicle turning around at the current position to reach the target position according to the third path; and plan a fourth path according to the current position, the turning-around position, the target position, and the advancing directions indicated by the landmarks disposed on the two sides of the first lane under a condition that the turning-around position does not coincide with the current position, thereby the unmanned vehicle moving straight forward from the current position to the turning-around position and turning around at the turning-around position to reach the target position according to the fourth path.

13. system for controlling a path of an unmanned vehicle, comprising:
an apparatus for controlling a path of an unmanned vehicle according to claim 12, and
the unmanned vehicle, configured to transmit landmark information on a current position to the apparatus, thereby the apparatus planning a path from the current position to a target position of the unmanned vehicle, and configured to move to the target position according to a planned path transmitted by the apparatus.

14. The system according to claim 13, wherein
the unmanned vehicle is further configured to identify landmark information of landmarks disposed on two sides of roads during moving to the target position according to the planned path, compare the identified landmark information with the planned path, and transmit the landmark information on the current position to the apparatus under a condition that the identified landmark information does not consistent with the planned path, thereby the apparatus replanning a path from the current position to the target position.

15. A non-transitory computer readable storage medium, wherein the computer readable storage medium stores computer instructions which, when executed by a processor, cause the processor to:
query a current position and a target position of an unmanned vehicle;
perform path planning according to the current position, the target position and advancing directions indicated by landmarks disposed on two sides of roads to obtain a planned path with a minimum path cost, wherein the unmanned vehicle moves forward on a predetermined side of a road; and
transmit the planned path to the unmanned vehicle, thereby the unmanned vehicle reaching the target position according to the planned path,
wherein the perform path planning according to the current position, the target position and the advancing directions indicated by the landmarks disposed on the two sides of the roads comprises:
determine whether the current position and the target position are both located in a first lane in the roads;
determine whether the unmanned vehicle can reach the target position by moving straight forward without turning around according to an advancing direction indicated by a landmark corresponding to the current position under a condition that the current position and the target position are both located in the first lane;
detect a type of the landmark corresponding to the current position under a condition that the unmanned vehicle reaches the target position by turning around;
determine a turning-around position according to the current position, the target position and the advancing direction of the landmark corresponding to the current position under a condition that the type of the landmark corresponding to the current position is a second-type of the landmark, thereby the unmanned vehicle directly reaching the target position, or moving straight forward to reach the target position, after turning around from the turning-around position to an other side of the lane, wherein the second-type of the landmark comprises a second advancing direction for moving straight forward and a third advancing direction for turning around;
determine whether the turning-around position coincides with the current position;
plan a third path according to the current position, the target position and the advancing directions indicated by the landmarks disposed on the two sides of the first lane under a condition that the turning-around position coincides with the current position, thereby the unmanned vehicle turning around at the current position to reach the target position according to the third path; and
plan a fourth path according to the current position, the turning-around position, the target position, and the advancing directions indicated by the landmarks disposed on the two sides of the first lane under a condition that the turning-around position does not coincide with the current position, thereby the unmanned vehicle moving straight forward from the current position to the turning-around position and turning around at the turning-around position to reach the target position according to the fourth path.

* * * * *